(12) United States Patent
Hersh

(10) Patent No.: US 6,760,726 B1
(45) Date of Patent: Jul. 6, 2004

(54) SYSTEM AND METHOD OF MANAGING CONCURRENT OPERATIONS ON LINKED LISTS

(75) Inventor: Clifford L. Hersh, Berkeley, CA (US)

(73) Assignee: ANTs Software, Burlingame, CA (US)

( * ) Notice: Subject to any disclaimer, the term of this patent is extended or adjusted under 35 U.S.C. 154(b) by 342 days.

(21) Appl. No.: 09/884,243

(22) Filed: Jun. 19, 2001

(51) Int. Cl.[7] .......................................... G06F 17/30
(52) U.S. Cl. ................................................. 707/8
(58) Field of Search ..................... 707/102, 8

(56) References Cited

U.S. PATENT DOCUMENTS

| | | | | |
|---|---|---|---|---|
| 5,504,899 A | * | 4/1996 | Raz | 707/10 |
| 5,893,140 A | * | 4/1999 | Vahalia et al. | 711/118 |
| 5,991,845 A | * | 11/1999 | Bohannon et al. | 710/200 |
| 6,081,665 A | * | 6/2000 | Nilsen et al. | 717/116 |
| 2002/0016900 A1 | * | 2/2002 | Miller | 711/220 |
| 2002/0029239 A1 | * | 3/2002 | Sullivan et al. | 709/104 |
| 2002/0029357 A1 | * | 3/2002 | Charnell et al. | 714/9 |

* cited by examiner

*Primary Examiner*—Wayne Amsbury
(74) *Attorney, Agent, or Firm*—Carr & Ferrell LLP

(57) ABSTRACT

A method for pushing a list element onto a linked list without locking the linked list. The linked list includes a head element having a pointer to a first list element. The method includes the steps of (a) reading the pointer, (b) writing the pointer to a list element address field, and (c) atomically comparing the pointer written to the list element address field with the pointer to the first list element and exchanging an address of the list element for the pointer if the values compared are equal, else repeating steps (a) through (c). A non-blocking pop operation is also disclosed.

17 Claims, 11 Drawing Sheets

Address of First
Element 715

1200

SYSTEM AND METHOD OF MANAGING CONCURRENT OPERATIONS ON LINKED LISTS

CROSS-REFERENCE TO RELATED APPLICATIONS

This application is related to application 09/729,738 entitled "Lock-Free Lists", by Clifford L. Hersh and Herbert W. Sullivan, filed on Dec. 4, 2000, the disclosure of which is hereby incorporated by reference.

BACKGROUND

1. Field of the Invention

The invention relates generally to the field of computer algorithms and more particularly to a system and method for managing concurrent operations on linked lists.

2. Description of the Related Art

A linked list is a collection of elements, such as data elements, that are accessed in an explicitly ordered fashion. Common list access operations include a write or push operation which adds an element onto the list, and a read or pop operation which removes an element from the list.

Such list operations take a discrete interval of time to complete and often include more than one sequential step. With concurrent, a synchronous list operations taking place, a new list operation may be executed while the sequential steps of a currently-executing list operation are in progress. To avoid such a possibility and the consequent list inconsistencies and errors, prior art list management systems and methods have required that the list be locked for the duration of the list operation, whether pushing an element onto the list or popping an element from the list.

In the systems and methods of the prior art, consistency is improved at the expense of system performance. For example, new list operations are prevented from executing while the list is locked thereby reducing the throughput of the entire system.

What is needed then is a system and method for managing concurrent operations on linked lists that improves system performance. Such a system and method preferably increases system throughput by eliminating the need to lock the list under certain conditions.

SUMMARY OF THE INVENTION

A method for pushing a list element onto a linked list without locking the linked list is disclosed. The linked list includes a head element having a pointer to a first list element. The method includes the steps of (a) reading the pointer, (b) writing the pointer to a list element address field, and (c) atomically comparing the pointer written to the list element address field with the pointer to the first list element and exchanging an address of the list element for the pointer if the values compared are equal, else repeating steps (a) through (c).

An alternative embodiment of the invention includes a pop operation which polls a pop lock and takes ownership of the pop lock before popping an element from the linked list. This embodiment is preferably employed in a first condition in which the frequency of push operations dominates the frequency of pop operations and the likelihood of synchronous operations is high.

Yet another embodiment of the invention includes a method for popping a list element from a linked list, the list element including a next list element address and a list element counter. The linked list includes a head element having a pointer to the list element and a head counter equal to the list element counter, the next list element address and list element counter being stored in contiguous memory, and the pointer and head counter being stored in contiguous memory. The method includes (a) reading the pointer and head counter, (b) writing the pointer and head counter to a temporary head, (c) reading the next list element address and the list element counter from the list element, (d) incrementing the list element counter, (e) atomically comparing the pointer and head counter with the pointer and head counter written to the temporary head and exchanging the next list element address and the list element counter for the pointer and head counter if the values compared are equal, else repeating steps (a) through (e), and (f) decrementing the head counter.

This embodiment is preferably employed in a second condition in which the frequency of pop operations dominates the frequency of push operations and the likelihood of synchronous operations is low. A push operation in this embodiment operate in similar fashion to the push operation described above.

The invention includes a method by which an preferred method of pushing and popping list elements to the linked list is selected based upon the frequency of pop operations relative to push operations and the likelihood of synchronous operations.

The foregoing and other objects and advantages of the disclosed system and method will become apparent to those of ordinary skill in the art after having read the following detailed description of the preferred embodiments that are illustrated in the various drawing figures.

DETAILED DESCRIPTION OF THE INVENTION

It has been found that the distribution of pushing and popping operations and the degree of synchronicity of such list operations is susceptible to analysis and that a dynamic system and method for managing concurrent operations on linked lists based upon such analysis yields improved overall system performance. More particularly, in a first condition in which the frequency of push operations dominates the frequency of pop operations and the likelihood of synchronous operations is high, push operations can be performed without locking the list while a lock is employed only when popping an element from the list. In a second condition in which the frequency of pop operations dominates the frequency of push operations and the likelihood of synchronous operations is low, both push and pop operations can be performed without locking the list. In either condition, the push operation is performed without locking the list.

Figure 1:
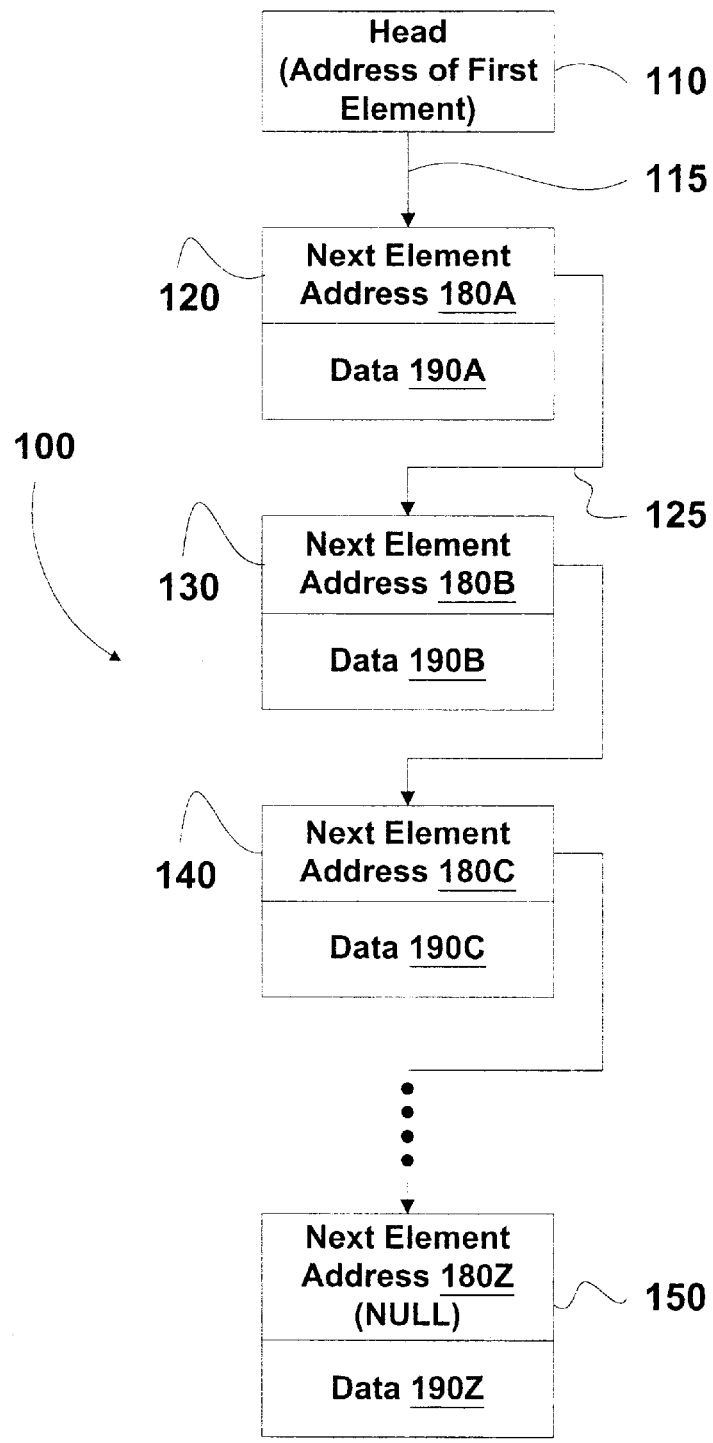
FIG. 1 is a block diagram illustrating a linked list of the prior art.

For the purpose of describing the method and system of the invention, reference is made to FIG. 1 in which an exemplary linked list generally designated 100 is shown. Linked list 100 includes a head 110 which has an address to a first list element 120. As such, head 110 is a pointer 115 to the first list element 120.

First list element 120 includes a data structure having two fields or elements; a next element address field 180A and a data field 190A. Next element address field 180A includes an address of a next element in the linked list 100 and data field 190A includes data. Thus for example, first list element next address field 180A includes an address of a second list element 130, alternatively shown as a pointer 125, and second list element next address field 180B includes an address of a third list element 140 and so on. A last list element 150 includes a next element address field 180A having a NULL pointer. The linked list 100 may be empty in which case pointer 115 is a NULL pointer.

The push operation in accordance with the invention is executed without locking the linked list 100 by using an atomic interlocked compare and exchange (ICE) operation to simultaneously exchange pointers and confirm that the linked list 100 is in a desired state as further described below. The ICE operation is available as an instruction for modern processors and includes instructions such as Intel's atomic LOCK CMPXCHG instruction (Intel is a trademark registered to Intel Corp. of Santa Clara, Calif.). The LOCK CMPXCHG instruction atomically compares a value loaded in a register with a first operand and if the two values are equal, loads a second operand into the first operand. Otherwise, the first operand is loaded into the register.

A push operation generally designated 200 executed in accordance with a method of the invention is illustrated in FIGS. 2 through 5. With initial reference to FIG. 2, in a step 210 a pointer is read from a head of a linked list and in a step 220 the pointer is written to a next element address field of a new list element to be pushed onto the linked list. Thus, by way of example and with reference to FIG. 3, pointer 115 is read from head 110 in step 210 and written to a next element address field 180X of a new list element 300 in step 220. After the execution of step 220, the next element address field 180X includes a pointer 117 to first list element 120.

In a step 230 an atomic interlocked compare and exchange (ICE) operation is executed. The value of the next element address field 180X (pointer 117) is compared to the value of pointer 115 in head 110 and if they are equal, an address of the new list element is exchanged for the value of pointer 115 in head 110. Otherwise, the address of the new list element is not exchanged and the method continues as further described below.

Figure 4:
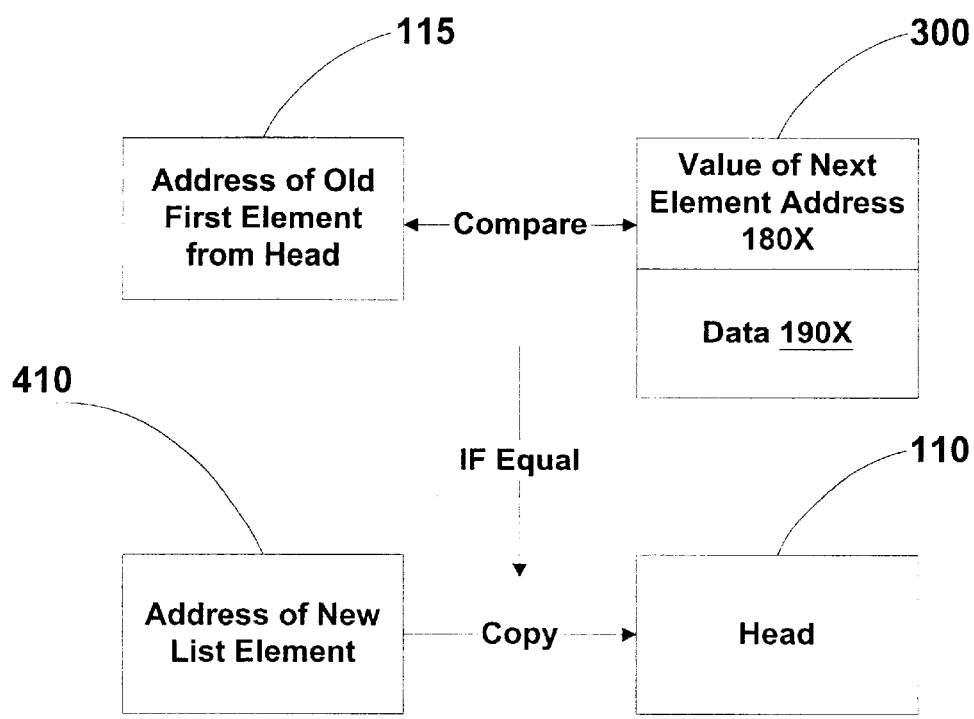
FIG. 4 is a block diagram illustrating an atomic interlocked compare and exchange (ICE) operation.

Step 230 is further illustrated in FIG. 4 in which the value of pointer 115 in head 110 is compared to the value of the next element address field 180X (pointer 117). If the values are equal, then an address 410 of the new list element 300 is copied to head 110 and pointer 115 points to the new list element 300 as shown in FIG. 5.

The condition where the compared values are equal indicates that the value of pointer 115 in head 110 has not changed between the time it was read in step 210 and written to the next element address field 180X of the new list element 300 in step 220. Additionally, as the ICE operation is executed atomically, no concurrent operation can push or pop a list element to the linked list 100 while the ICE operation executes, thereby ensuring the integrity of push operation 200.

Figure 2:
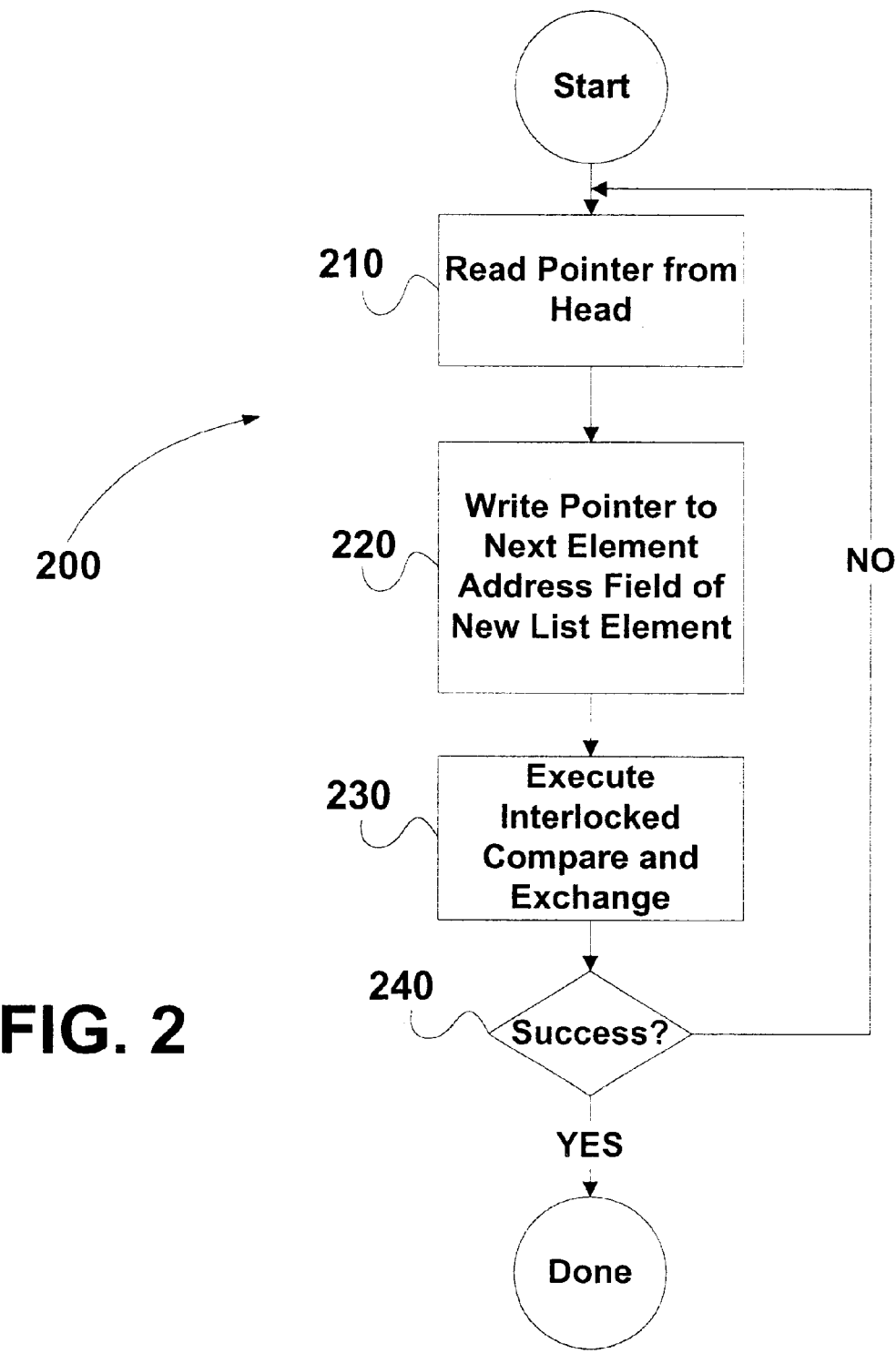
FIG. 2 is a flowchart illustrating the steps of a push operation according to a method of the invention.
Figure 3:
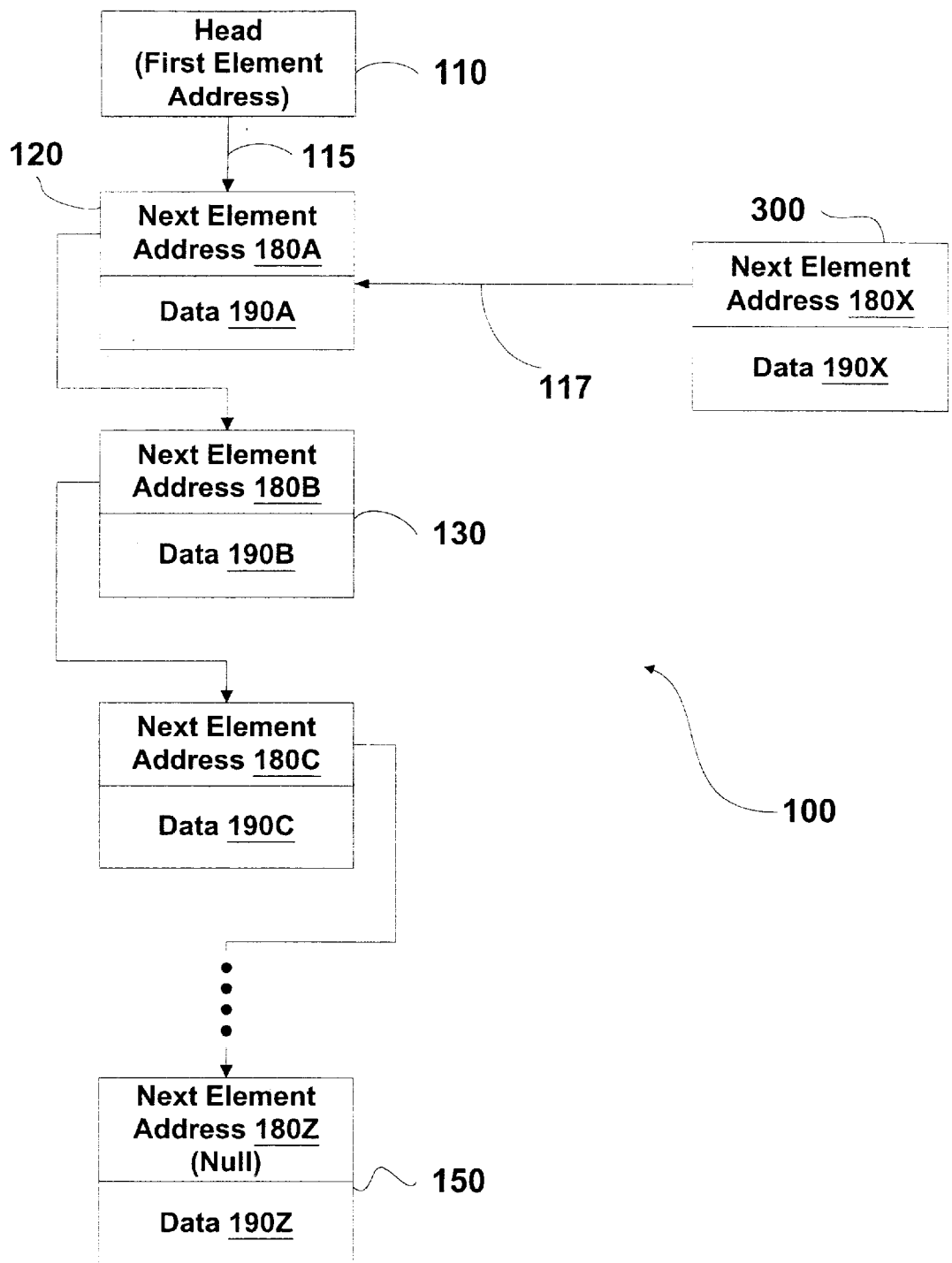
FIG. 3 is a block diagram illustrating an intermediate state according to the push operation of FIG. 2.

With reference to FIG. 2, in a step 240 the success of the ICE operation executed in step 230 is evaluated. If the ICE operation succeeds, that is, if the compared values are equal, then the process ends. Otherwise, the process returns to step 210 and repeats until it succeeds. In the case where the ICE operation succeeds, list element 300 has been pushed onto the linked list 100.

Figure 5:
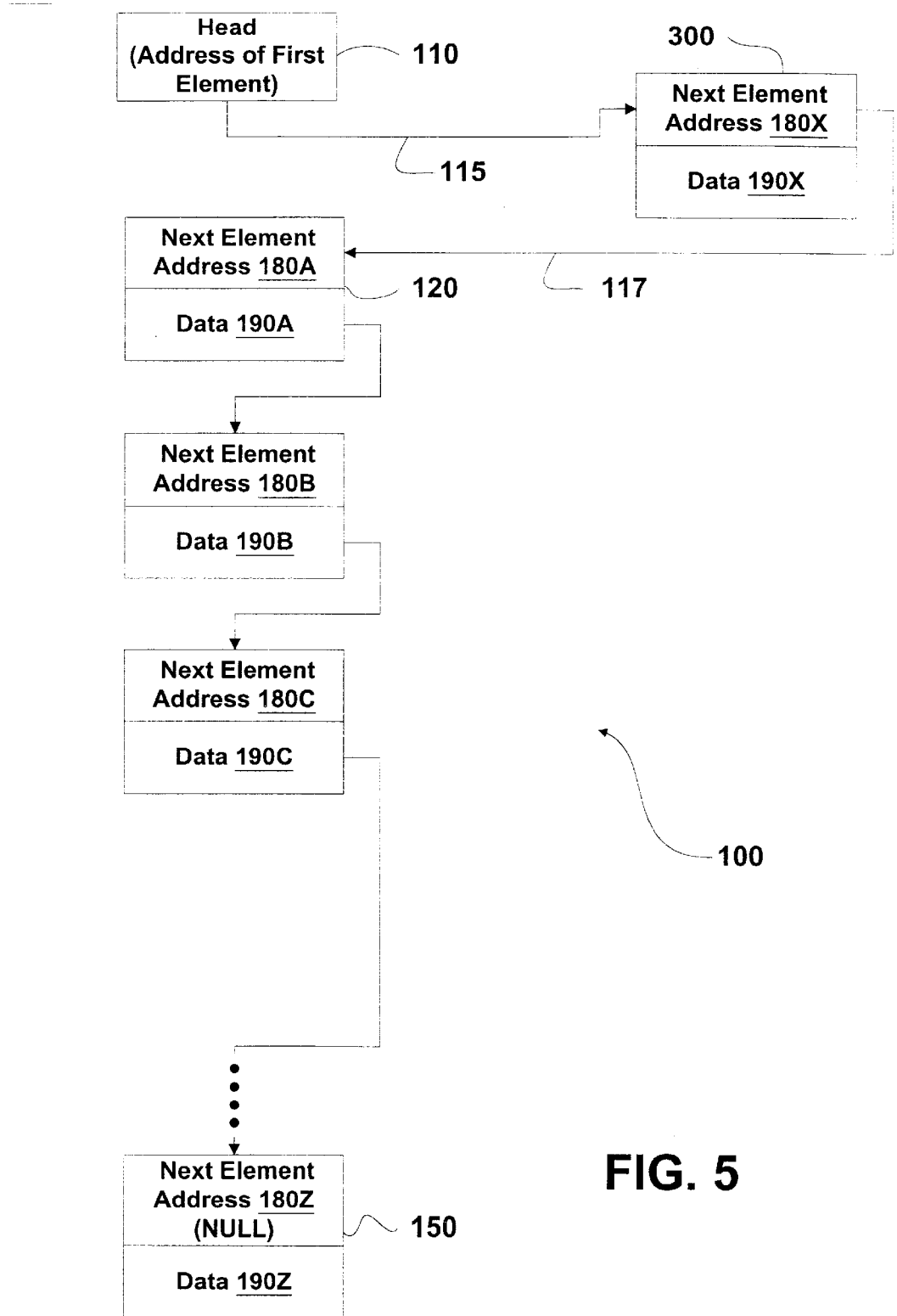
FIG. 5 is a block diagram illustrating a final state according to the push operation of FIG. 2.

As illustrated in FIG. 5, if the ICE operation succeeds, new list element 300 is pushed onto linked list 100. Head 110 now includes pointer 115 which points to new list element 300. The next element address field 180X of new list element 300 includes pointer 117 which points to list element 120.

The ICE operation of step 230 fails if the comparison of the value of the next element address field 180X (pointer 117) and the value of pointer 115 in head 110 fails. Such a failure of the comparison indicates that the value of the pointer 115 in head 110 has changed between steps 210 and 220 and that therefore the condition of linked list 100 has changed. Such a changed condition includes the conditions wherein list element 120 has been popped from the linked list 100 and/or another list element (not shown) has been pushed to the linked list 100.

Push operation 200 always succeeds in pushing list element 300 onto the linked list 100. Furthermore, linked list 100 is never locked during the execution of push operation 200. As noted above, in the first condition in which the frequency of push operations dominates the frequency of pop operations and the likelihood of synchronous operations is high, push operation 200 is highly effective in improving overall system performance.

Figure 6:
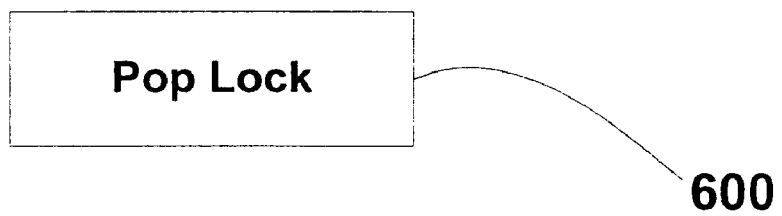
FIG. 6 is a block diagram illustrating a pop lock in accordance with the invention.

With reference to FIG. 6, a pop operation in accordance with the invention utilizes a pop lock 600 in the first situation where the frequency of push operations dominates the frequency of pop operations and the likelihood of synchronous operations is high. Implementation of pop lock 600 includes at least one bit set when a pop operation owns the pop lock 600. Before a pop operation removing a list element from the linked list 100 can execute, the pop lock 600 is polled to determine if another pop operation owns the pop lock 600. A pop operation can only execute if it has ownership of pop lock 600. Thus, only one pop operation executes at a time.

As the likelihood of synchronous operations is high in the first situation, the cost of using the pop lock 600 is no greater than an implementation in which the linked list 100 is locked. However, even in the case where pop operations must frequently poll the pop lock 600, improvement in overall system performance is achieved by the system and method of the invention as the push operation 200 proceeds without reference to the pop lock 600.

In the second condition in which the frequency of pop operations dominates the frequency of push operations and the likelihood of synchronous operations is low, both push and pop operations can be performed without locking the linked list. As in the case of the implementation applicable to the first condition, push operation 200 operates without locking the linked list as further described below.

Figure 7:
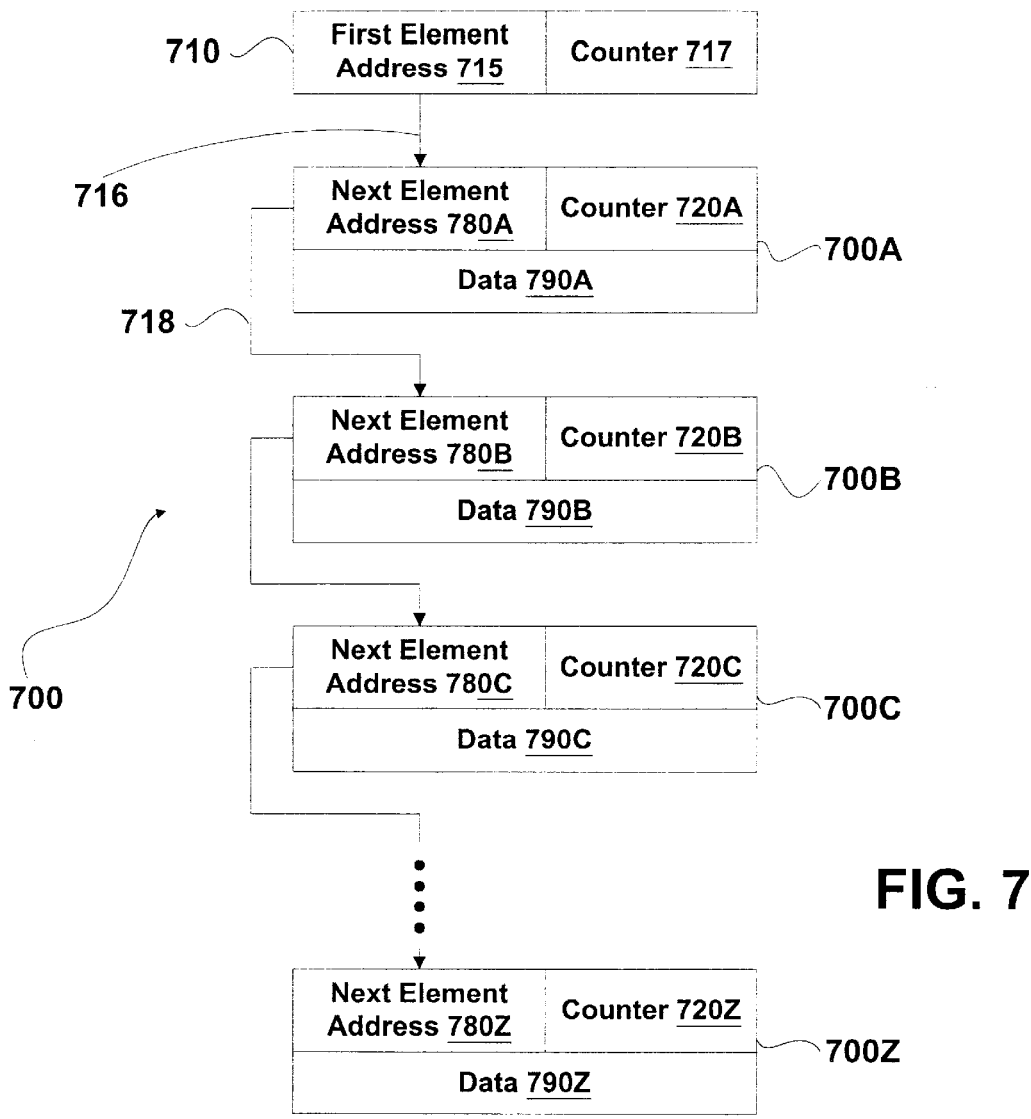
FIG. 7 is a block diagram illustrating a linked list in accordance with another embodiment of the invention.

In accordance with this aspect of the invention, a linked list 700 illustrated in FIG. 7 includes a plurality of list elements 700A through 700Z. Each such list element includes a next element address field 780A through 780Z respectively and a data field 790A through 790Z respectively. Additionally, each list element includes a counter 720A through 720Z respectively stored in contiguous memory with next element address field 780A through 780Z respectively. Counters 720A through 720Z are set to the same value as list elements 700A through 700Z are pushed onto the linked list 700.

Linked list 700 also includes a head 710 having a first element address field 715 and a counter 717 (equal to counters 720A through 720A) stored in contiguous memory with first element address field 715. As shown, head 710 stores a pointer 716 to a first list element 700A in first element address field 715.

Figure 8:
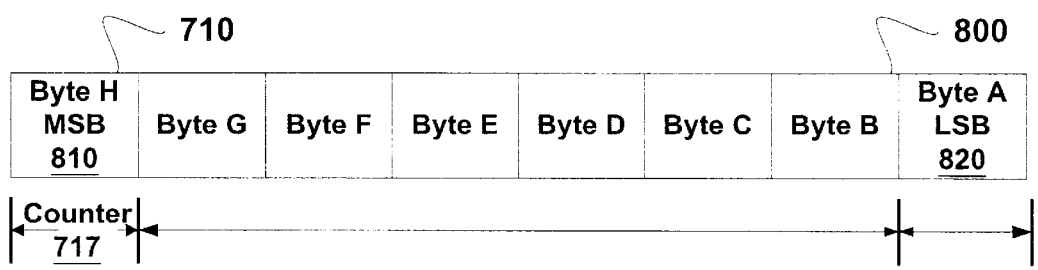
FIG. 8 is a block diagram illustrating a data structure in accordance with another embodiment of the invention.

A structure of head 710 is shown in FIG. 8. Head 710 includes an eight-byte data element 800. The counter 717 is shown occupying the most significant byte (MSB) 810 of data element 800. The first element address 715 occupies a least significant byte (LSB) 820 of data element 800. In this representative example, the remaining bytes are masked. Since first element address 715 and counter 717 occupy a single data structure (data element 800) they can be manipulated as a single variable. Although the counter 717 and next element address 715 have been described as occupying specific portions of the data element, those skilled in the art will recognize that the order may be reversed and that the particular relative memory allocations are illustrative only.

Similarly, each counter 720A through 720Z also occupies a most significant byte of a data element (not shown) within each list element 700A through 700Z respectively. Additionally, each next element address field 780A through 780Z occupies the least significant byte of a respective data element.

Figure 9:
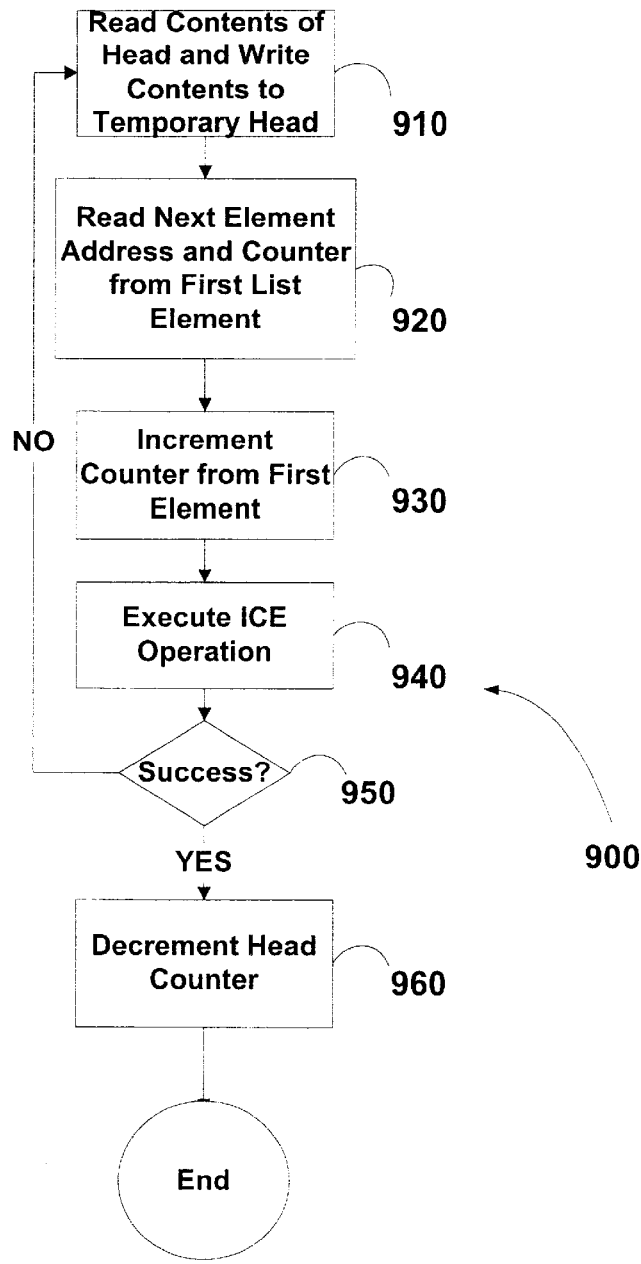
FIG. 9 is a flowchart illustrating steps of a pop operation according to another embodiment of the invention.
Figure 10:
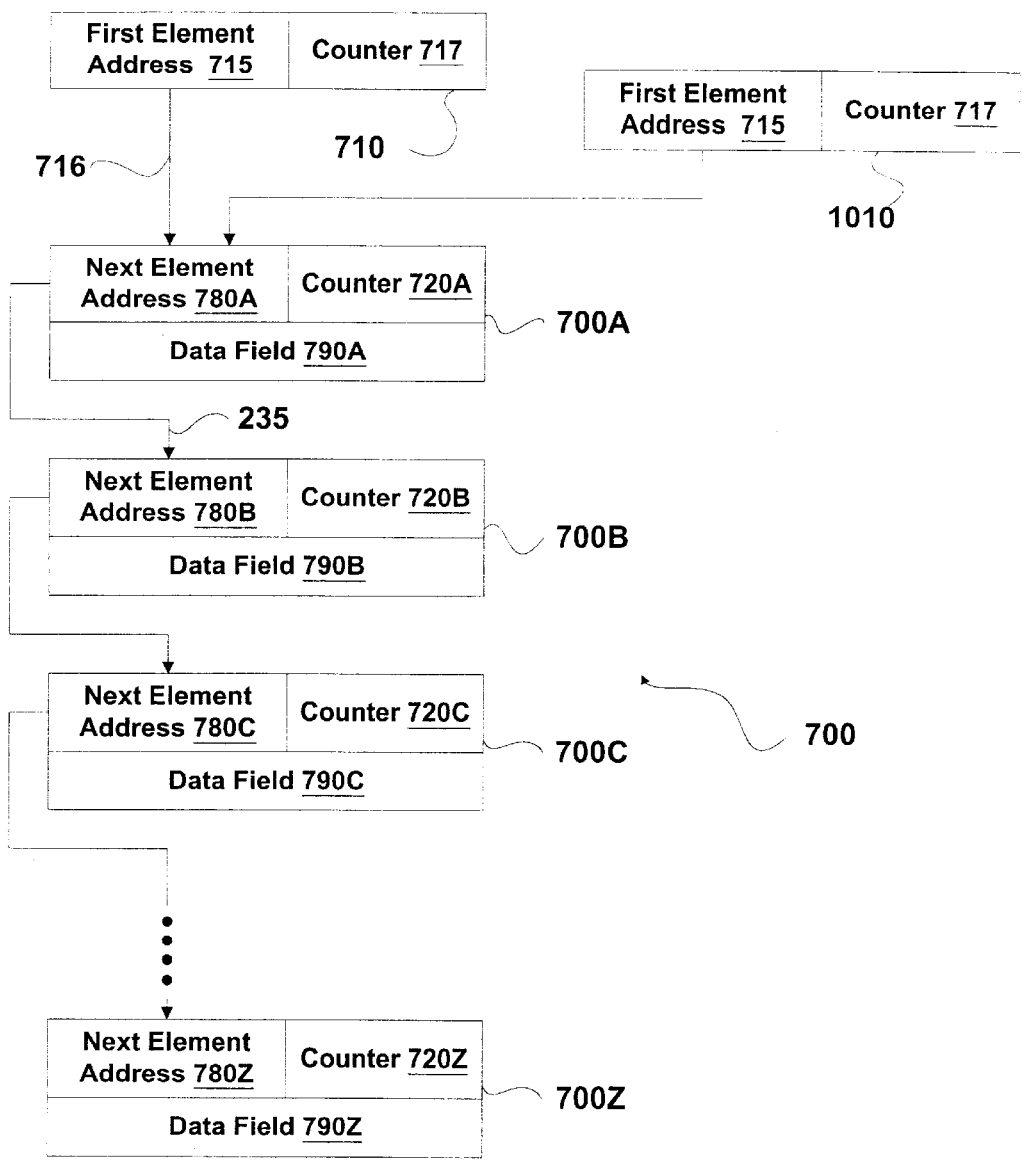
FIG. 10 is a block diagram illustrating an intermediate state of a popped linked list.
Figure 11:
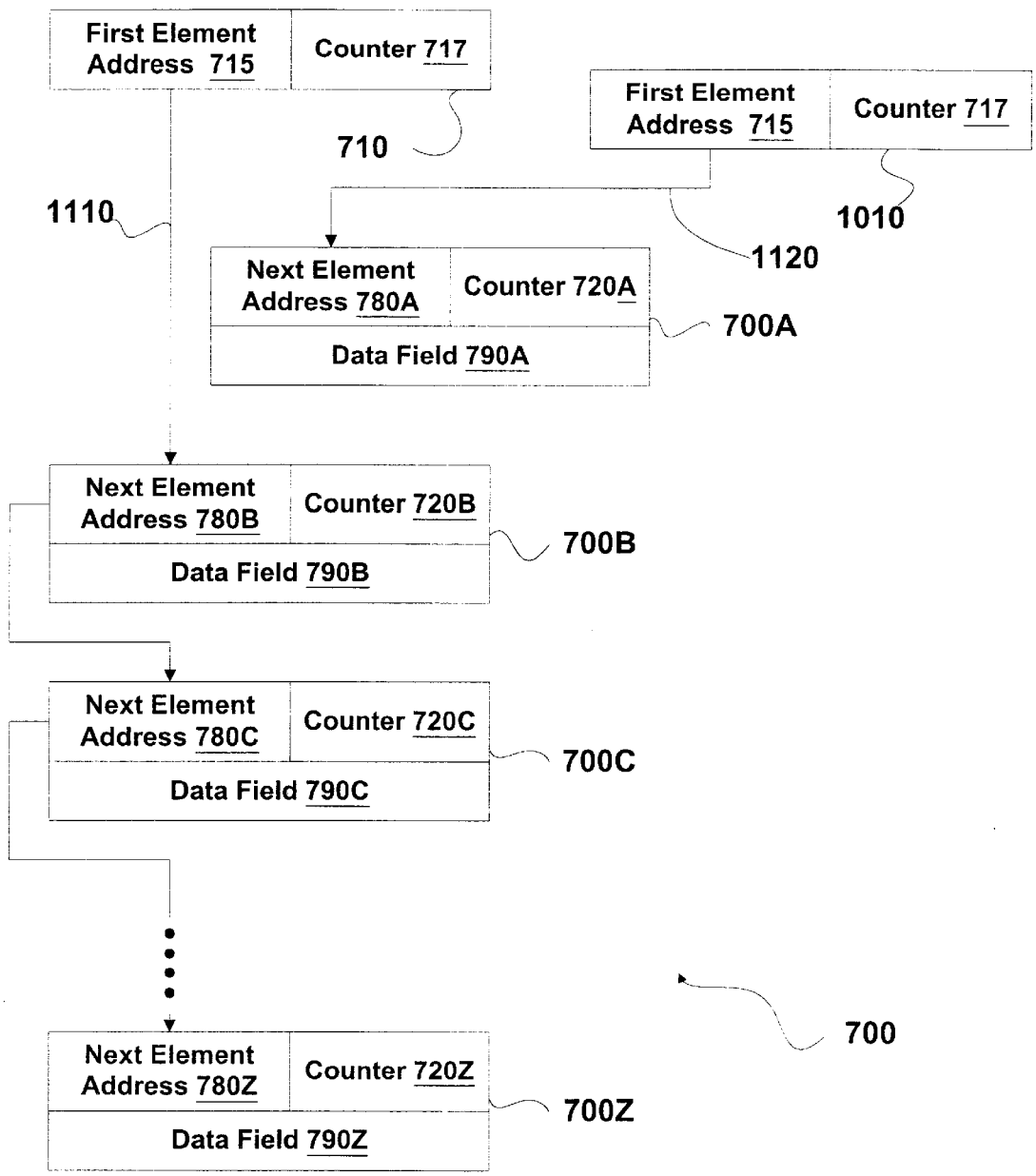
FIG. 11 is a block diagram illustrating a final state of the popped linked list of FIG. 10.

FIGS. 9 through 11 illustrate a method of performing a pop operation on the linked list 700 in accordance with an aspect of the invention. The illustrated method generally designated 900 in FIG. 9 provides for popping a first list element 700A from the linked list 700 without locking the linked list 700.

In a step 910 the contents of head 710 are read and copied to a temporary head 1010 (FIG. 10). In a step 920 a next element address 780A and counter 720A are read from the first list element 700A. In a step 930 the counter 720A is incremented. As further described below, this assures that if a list element is popped from the linked list 700 between steps 930 and 940, the comparison in a step 940 will fail.

In step 940 an atomic ICE operation is executed. The value of the first element address 715 (pointer 716) and counter 717 of head 710 is compared to the value of the first list element next element address field 780A and counter 720A stored in the temporary head 1010. If these values are equal then the value of the next element address 780A and counter 720A (incremented in step 930) is copied to head 710. The ICE operation uses the entire data element of each of the three variables so that the address and counter are treated as a single value during the comparison and exchange.

In a step 950 the success of the ICE operation is evaluated. If the ICE operation was not successful, then the process returns to step 910 and the values used in the ICE operation of step 940 are updated by repeating steps 910 through 930. The failure of the ICE operation indicates that another pop operation has successfully been executed upon the linked list 700 and the comparison fails because the counter 717 in temporary head 1010 is compared to an incremented value of counter 717 in head 710. Steps 910 through 940 are repeated until a successful exchange occurs in step 940.

In a step 960, the counter 720A copied to head 710 is decremented so that counters 720A through 720Z are equal.

With reference to FIG. 11, a final state of the linked list 700 is shown. If the ICE operation of step 940 is successful, the first element address field 715 of head 710 includes pointer 1110 to the new first list element 700B. Temporary head 1010 includes pointer 1120 that points to popped list element 700A.

A push operation. within the context of the implementation described with reference to FIGS. 9 through 11, includes an ICE operation in which the value of the first element address 715 of head 710 is compared to a value of the first element address 715 written to a temporary head (not shown) as described with reference to method 200. Thus in the implementation described with reference to FIGS. 9 through 11, neither the push operation nor the pop operation utilize a lock on the linked list 700. As noted above, this implementation finds advantageous application in the second condition in which the frequency of pop operations dominates the frequency of push operations and the likelihood of synchronous operations is low.

Figure 12:
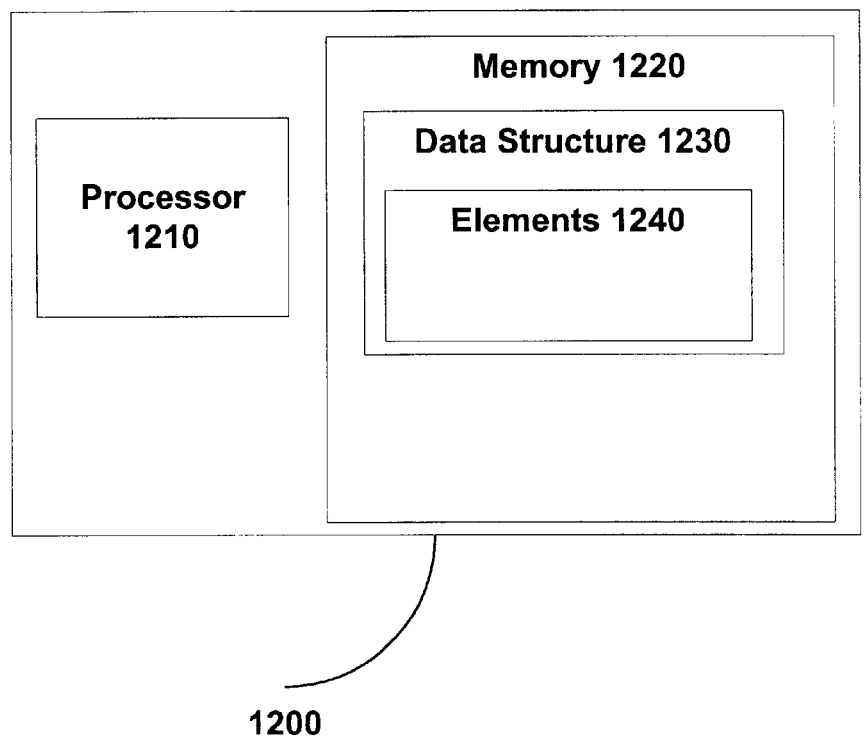
FIG. 12 is a block diagram illustrating a computing system according to the present invention.

In another aspect of the invention and with reference to FIG. 12, a system 1200 for pushing a list element onto a linked list includes a memory 1220 for storing a data structure 1230 such as a linked list having elements 1240 and a processor 1210. Processor 1210 is operable to (a) read a pointer, (b) write the read pointer to a list element address field, and (c) atomically compare the pointer written to the list element address field with the pointer to the first list element and exchange an address of the list element for the pointer to the first list element if the values compared are equal, else to call processes (a) through (c).

Several embodiments are specifically illustrated and/or described herein. However, it will be appreciated that modifications and variations are covered by the above teachings and within the scope of the appended claims without departing from the spirit and intended scope thereof.

I claim:

1. A method for pushing a list element onto a linked list, the linked list including a head element having a pointer to a first list element, the method comprising the steps of:
   (a) reading the pointer;
   (b) writing the read pointer to a list element address field; and
   (c) atomically comparing the pointer written to the list element address field with the pointer to the first list element and exchanging an address of the list element for the pointer to the first list element if the values compared are equal, else repeating steps (a) through (c).

2. The method of claim 1 wherein the atomic comparison is a locked compare exchange operation.

3. The method of claim 1 further comprising the step of allocating memory for the list element.

4. The method of claim 3 further comprising the step of writing data to the list element.

5. The method of claim 4 wherein the data further comprises an executable instruction.

6. A system for pushing a list element onto a linked list, the linked list including a head element having a pointer to a first list element, the system comprising:
   (a) a process operative to read the pointer;
   (b) a process operative to write the read pointer to a list element address field; and
   (c) a process operative to atomically compare the pointer written to the list element address field with the pointer to the first list element and exchanging an address of the list element for the pointer to the first list element if the values compared are equal, else operative to call processes (a) through (c).

7. A computer readable medium for pushing a list element onto a linked list, the linked list including a head element having a pointer to a first list element, the computer readable medium comprising:
   (a) a code segment for reading the pointer;
   (b) a code segment for writing the read pointer to a list element address field; and
   (c) a code segment for atomically comparing the pointer written to the list element address field with the pointer to the first list element and exchanging an address of the list element for the pointer to the first list element if the values compared are equal, else operative to call the processes (a) through (c).

8. A system for pushing a list element onto a linked list, the linked list including a head element having a pointer to a first list element, the system comprising:
   (a) means for reading the pointer;
   (b) means for writing the read pointer to a list element address field; and
   (c) means for atomically comparing the pointer written to the list element address field with the pointer to the first list element and exchanging an address of the list element for the pointer to the first list element if the values compared are equal, else for calling processes (a) through (c).

9. A system for pushing a list element onto a linked list, the linked list including a head element having a pointer to a first list element, the system comprising:
   a memory for storing the linked list; and
   a processor, the processor operable to
   (a) read the pointer,
   (b) write the read pointer to a list element address field, and
   (c) atomically compare the pointer written to the list element address field with the pointer to the first list element and exchange an address of the list element for the pointer to the first list element if the values compared are equal, else to call processes (a) through (c).

10. A method for popping a compound list element from a linked list, the compound list element including a next list element address and a compound list element counter, the linked list including a compound head element having a pointer to the compound list element and a compound head counter, the next list element address and the compound list element counter being stored in contiguous memory, and the pointer to the compound list element and the compound head counter being stored in contiguous memory, the method comprising the steps of:
   (a) reading the pointer to the compound list element and the compound head counter;
   (b) writing to contiguous memory in a temporary head the read pointer to the compound list element and the read compound head counter;
   (c) reading the next list element address and the compound list element counter from the compound list element;
   (d) incrementing the compound list element counter;
   (e) atomically comparing the pointer to the compound list element and the compound head counter with the pointer to the compound list element and the compound head counter written to the temporary head and exchanging the next list element address and the compound list element counter for the pointer to the compound list element and the compound head counter if the values compared are equal, else repeating steps (a) through (e).

11. The method of claim 10 wherein the atomic comparison is a locked compare exchange operation.

12. The method of claim 10 further comprising the step of incrementing the compound head counter stored in the temporary head.

13. The method of claim 12 further comprising the step of accessing the compound list element by means of the temporary head.

14. A system for popping a compound list element from a linked list, the compound list element including a next list element address and a compound list element counter, the linked list including a compound head element having a pointer to the compound list element and a compound head counter, the next list element address and the compound list element counter being stored in contiguous memory, and the pointer and the compound head counter being stored in contiguous memory, the system comprising:
   (a) a process for reading the pointer and compound head counter;
   (b) a process for writing to contiguous memory in a temporary head the read pointer and the read compound head counter;
   (c) a process for reading the next list element address and the compound list element counter from the compound list element;
   (d) a process for incrementing the compound list element counter; and
   (e) a process for atomically comparing the pointer and compound head counter with the pointer an d compound head counter written to the temporary head and exchanging the next list element address and the. compound list element counter for the pointer and compound head counter if the values compared are equal, else operative to call processes (a) through (e).

15. A computer readable medium for popping a compound list element from a linked list, the compound list element including a next list element address and a compound list element counter, the linked list including a compound head element having a pointer to the compound list element and a compound head counter, the next list element address and the compound list element counter being stored in contiguous memory, and the pointer and the compound head counter being stored in contiguous memory, the computer readable medium comprising:
   (a) a code segment for reading the pointer and compound head counter;
   (b) a code segment for writing to contiguous memory in a temporary head the read pointer and the read compound head counter;
   (c) a code segment for reading the next list element address and the compound list element counter from the compound list element;

(d) a code segment for incrementing the compound list element counter;

(e) a code segment for atomically comparing the pointer and the compound head counter with the pointer and the compound head counter written to the temporary head and exchanging the next list element address and the compound list element counter for the pointer and the compound head counter if the values compared are equal, else repeating steps (a) through (e).

16. A system for popping a compound list element from a linked list, the compound list element including a next list element address and a compound list element counter, the linked list including a compound head element having a pointer to the compound list element and a compound head counter, the next list element address and the compound list element counter being stored in contiguous memory, and the pointer and the compound head counter being stored in contiguous memory, the system comprising:

a memory for storing the linked list; and a processor, the processor operable to
   (a) read the pointer and compound head counter,
   (b) write to contiguous memory in a temporary head the read pointer and the read compound head counter,
   (c) read the next list element address and the compound list element counter from the compound list element,
   (d) increment the compound list element counter, and
   (e) atomically compare the pointer and compound head counter with the pointer and compound head counter written to the temporary head and exchange the next list element address and the compound list element counter for the pointer and compound head counter if the values compared are equal, else call processes (a) through (e).

17. A method for pushing a list element including a next list element address and a list element counter onto a linked list, the linked list including a head element having a pointer to a first list element and a head counter, the next list element address and the list element counter being stored in contiguous memory and the pointer and the head counter being stored in contiguous memory, the method comprising the steps of:

(a) reading the pointer and head counter;

(b) writing the read pointer to the next list element address and the read head counter to the list element counter; and (c) atomically comparing the pointer and head counter written to the next list element address and the list element counter respectively, with the pointer to the first list element and the head counter and exchanging an address of the list element for the pointer if the values compared are equal, else repeating steps (a) through (c).

* * * * *